United States Patent
McCoy et al.

(10) Patent No.: US 10,218,946 B1
(45) Date of Patent: Feb. 26, 2019

(54) HIGH SPECTRUM CAMERA

(71) Applicant: Sony Interactive Entertainment LLC, San Mateo, CA (US)

(72) Inventors: Charles McCoy, San Mateo, CA (US); True Xiong, San Mateo, CA (US); Blaine Morgan, San Mateo, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/689,535

(22) Filed: Aug. 29, 2017

(51) Int. Cl.
| | |
|---|---|
| H04N 7/18 | (2006.01) |
| H04N 9/083 | (2006.01) |
| H04N 5/225 | (2006.01) |
| H04N 9/43 | (2006.01) |
| G02B 27/10 | (2006.01) |
| G02B 27/12 | (2006.01) |
| F21V 8/00 | (2006.01) |
| G02B 7/18 | (2006.01) |
| H04N 5/33 | (2006.01) |

(52) U.S. Cl.
CPC .......... *H04N 9/083* (2013.01); *G02B 6/0096* (2013.01); *G02B 7/1805* (2013.01); *G02B 27/1006* (2013.01); *G02B 27/1086* (2013.01); *G02B 27/126* (2013.01); *H04N 5/2254* (2013.01); *H04N 9/43* (2013.01); *H04N 5/332* (2013.01)

(58) Field of Classification Search
CPC ........ H04N 9/083; H04N 9/43; H04N 5/2254; H04N 5/332; G02B 7/1805; G02B 6/0096; G02B 27/1086; G02B 27/1006; G02B 27/126

USPC .......................................................... 348/33
See application file for complete search history.

(56) References Cited

U.S. PATENT DOCUMENTS

| | | | | |
|---|---|---|---|---|
| 5,903,712 | A * | 5/1999 | Wang | B41F 33/0009 |
| | | | | 101/211 |
| 6,344,846 | B1 * | 2/2002 | Hines | G06F 3/0312 |
| | | | | 345/156 |
| 7,077,524 | B2 * | 7/2006 | Roth | H04N 9/3114 |
| | | | | 348/57 |
| 9,727,962 | B2 * | 8/2017 | Hauger | A61B 5/0071 |
| 10,012,838 | B2 * | 7/2018 | Border | G02B 27/0176 |
| 2001/0007506 | A1 * | 7/2001 | Mikami | H04B 10/503 |
| | | | | 398/202 |

(Continued)

OTHER PUBLICATIONS

Rueda et al, High-dimensional optimization of color coded apertures for compressive spectral cameras (Year: 2017).*

*Primary Examiner* — Shan E Elahi
(74) *Attorney, Agent, or Firm* — John L. Rogitz

(57) ABSTRACT

In one aspect, a prism is used to separate white light into individual color components, which are used to illuminate an object in sequence. This can be effected by rotating the prism. Reflections from the object are captured by a high resolution black and white camera. A frequency detector is used to also receive the individual colors that illuminate the object so that the high-resolution pixels from the black and white camera can be correlated, for each captured value, to the specific color reflected from the object that created the pixel. In this way, the color spectrum of the object can be measured with high precision. Other examples that use stationary prisms also are disclosed. Examples are disclosed in which the prism(s) receive white light from the object and spread it in color components onto the imager.

20 Claims, 7 Drawing Sheets

High Spectrum Camera Using Sweep Frequency Illumination

(56) References Cited

U.S. PATENT DOCUMENTS

| | | | |
|---|---|---|---|
| 2004/0208602 A1* | 10/2004 | Plante | H04B 10/1125 398/140 |
| 2005/0063709 A1* | 3/2005 | Poisel | G02B 5/1857 398/152 |
| 2005/0190371 A1* | 9/2005 | Knuttel | G01B 11/24 356/479 |
| 2005/0275806 A1* | 12/2005 | Roth | H04N 9/3114 353/20 |
| 2006/0109476 A1* | 5/2006 | Werner | G01B 9/02035 356/477 |
| 2006/0221250 A1* | 10/2006 | Rossbach | G01S 17/89 348/630 |
| 2010/0198009 A1* | 8/2010 | Farr | A61B 1/00103 600/109 |
| 2010/0245943 A1* | 9/2010 | Suyama | G02B 6/0038 358/475 |
| 2010/0280321 A1* | 11/2010 | Modell | A61B 5/0066 600/160 |
| 2013/0307953 A1* | 11/2013 | Hauger | A61B 5/0071 348/71 |
| 2014/0071249 A1* | 3/2014 | Aflatouni | H04N 13/0207 348/49 |
| 2014/0362381 A1* | 12/2014 | Lindmuller | G01N 21/278 356/408 |

\* cited by examiner

High Spectrum Camera Using Sweep Frequency Illumination

Ambient Light High Spectrum Camera with Rotating Prisms
- Cross Section of the image sensor showing a single row of pixels Fixed prism with individual image sensors Fixed Prism with single plain image sensor Fixed prism with single plain image sensor and mirrors

HIGH SPECTRUM CAMERA

FIELD

The application relates to systems and methods for a high spectrum camera.

BACKGROUND

Knowing the color response of objects can reveal a great deal about the nature and condition of the object. For example, some maladies may manifest themselves by giving a person a particular color. Many other examples abound, including assaying the chemical makeup of farm acreage, etc. However, as understood herein wideband color sensors may lack resolution.

SUMMARY

Accordingly, in one aspect an apparatus includes at least one beam divider to receive white light and output separate color components of the white light to illuminate an object with a single one of the color components at a time, such that the object is illuminated with a first color component and no other color components at a first time and a second color component and no other components at a second time. At least one high resolution black and white imager is configured for receiving, from the object, reflections of the separate color components of the white light. At least one wavelength reference receiver (WRR) receives from the beam divider the separate color components of the white light, such that the WRR receives the first color component and no other color components at the first time and the second color component and no other components at the second time. In this way, information from the WRR can be correlated with pixel information from the black and white imager.

In examples, the beam divider includes a prism. In other examples, the bam divider can include a grating. In some examples, the beam divider is mounted for spinning on a housing. In other examples, the beam divider is not mounted for spinning on a housing and is stationarily mounted on the housing, and the beam divider further includes a movable slit positioned in an optical path that includes the prism.

In some implementations, at least a first light pipe is in an optical path between the beam divider and the object to direct the color components from the beam divider to the object. Similarly, at least a first light pipe may be disposed in an optical path between the beam divider and the WRR to direct the color components from the beam divider to the WRR. The WRR may include at least one frequency counter. In other examples, the WRR can includes at least one prism outputting light to an array of frequency sensing pixels.

At least one processor can be provided that is programmed with instructions to, based at least in part on the information from the WRR correlated with the pixel information from the black and white imager, output an indication of color response of the object.

In another aspect, an apparatus includes a rotatably mounted prism spreading white light from an object into separate color components. The apparatus also includes a stationarily mounted prism for receiving light from the rotatable mounted prism and sending the light to an array of frequency detection pixels. An image sensor is disposed between the rotatably mounted prism and the stationarily mounted prism to receive the color components of white light from the object and establish pixels values representing the reflections.

In another aspect, an apparatus includes plural prisms configured to receive reflections from an object. Each prism is in optical communication with a respective group of pixels established by at least one image sensor. The respective groups of pixels indicates information pertaining to spectral reflection from the object in plural color components.

In an aspect, a camera uses at least one prism that is in an optical path to an object to be imaged, a black and white imager to generate an image of the object, and a wavelength reference receiver coupled to the prism to record color components of white light involved in the imaging of the object. A processor correlates pixel intensities in the black and white image to the color components of the white light involved in the imaging of the object.

The details of the present application, both as to its structure and operation, can best be understood in reference to the accompanying drawings, in which like reference numerals refer to like parts, and in which:

DETAILED DESCRIPTION

Figure 1:
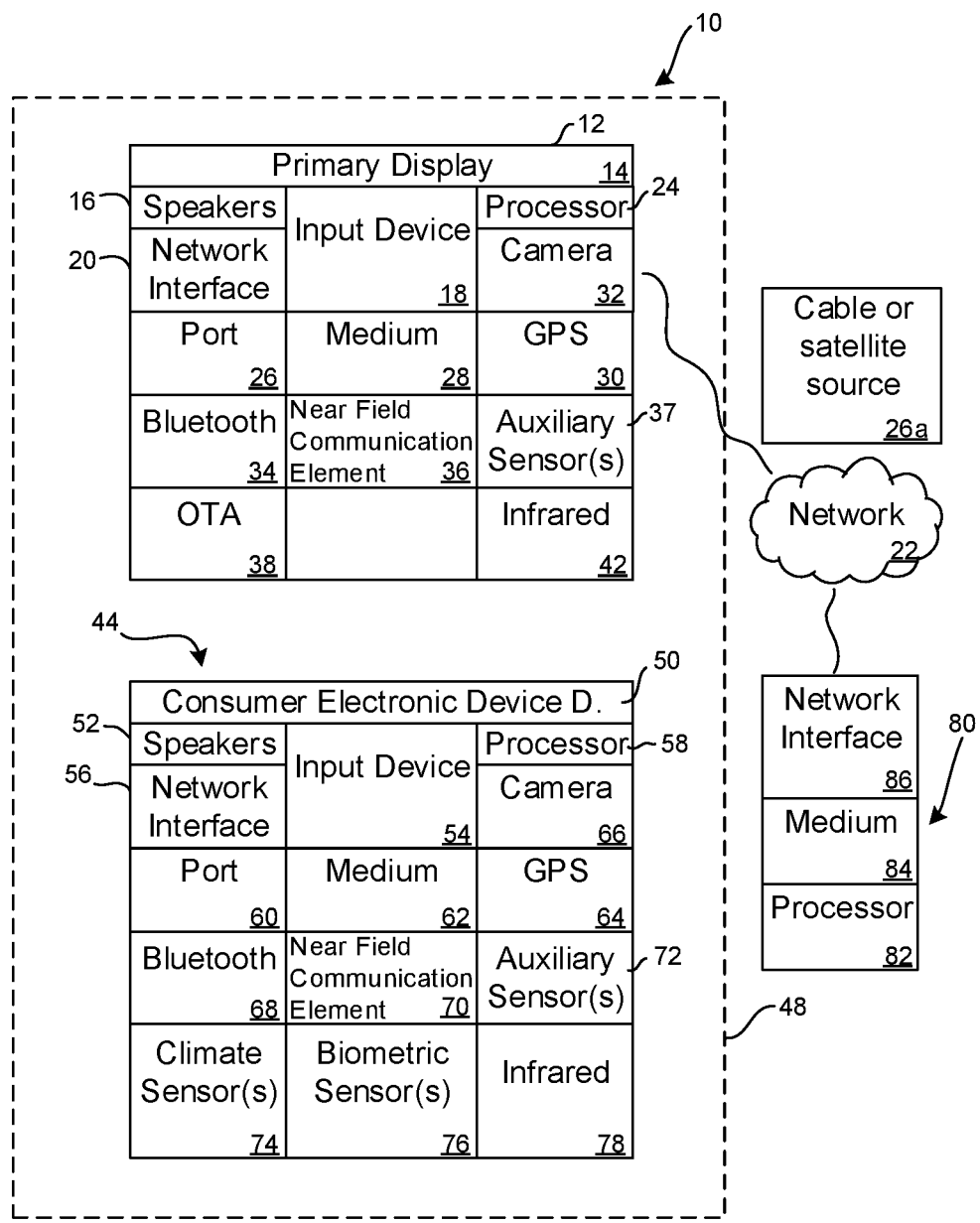
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content such as computer game software and databases. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Any of the cameras described herein may employ the high spectrum camera example or multiple examples described further below.

Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element. Zigbee also may be used.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown, or a hand-held game controller manipulated by the player 47. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a hard disk drive, CD ROM or Flash drive. The software code instructions may also be downloaded over the Internet.

With the above in mind, attention is now drawn to FIGS. 2-7, which show various arrangements of imaging components that may be employed by any of the cameras shown in FIG. 1 or by other camera systems. As will be further described below, a high spectrum camera system captures images with a high number of frequencies captured per pixel. The color components extend beyond simple red, green, and blue to include other color components in the visible spectrum and if desired in the infrared and ultraviolet spectra. In the first example below, a spinning prism receives white light (which may be sunlight) and illuminates an object with the color components separated by the prism, taking only light from a narrow band of the output of the prism to illuminate the object at any instant in time. A light pipe can be used to capture a selective slice of the prism output and direct it to the object. The light pipe can be split, directing a small portion of the light to a frequency sensor. As the prism spins and the bandwidth of light that illuminates the object changes, an image sensor such as a high resolution black and white sensor detects an image of the light reflected at that bandwidth. A wide spectrum image sensor can be used, which can capture an image more quickly than a typical image sensor. A frequency counter can be used to determine the bandwidth of light that is illuminating the subject as the image is captured. Each pixel in the image will have intensity data from many different frequencies and the information from the frequency counter can be used to correlate the pixel intensity information from the black and white sensor to the particular color that caused the pixel data to be generated. The system is effective for, e.g., medical imaging, since the images can act as a type of spectrograph, showing bright areas in narrow frequency bands corresponding to different absorption and reflectivity of different chemistries. Glucose monitoring and eye condition monitoring may be particular applications. Geologic assays are another application, as the spectrum reflected by different minerals can be detected to, e.g., determine the chemical composition in farmland. A tunable laser may be used in lieu of the prism.

In variations, the prism can receive white light from the object spin in front of each row of image sensors. Multiple prisms may be used and all of the prisms can rotate in alignment with each other. Frequency detectors can be included at the end of each row of pixels. Frequency detectors can be located between image sensors, which is advantageous when the light being captured is dark at the edges of the image. To this end, fiber optics from between each image sensor can be directed to one or more frequency sensors. This has the advantage of being able to capture a high spectrum image from an object where the lighting is not controlled, such as a sunlight landscape being photographed to detect minerals. Lenses may be provided in front of the prisms can focus the light entering the prisms into individual pixels. Ambient light may be sensed and subtracted from the pixel values captured by the camera.

Figure 2:
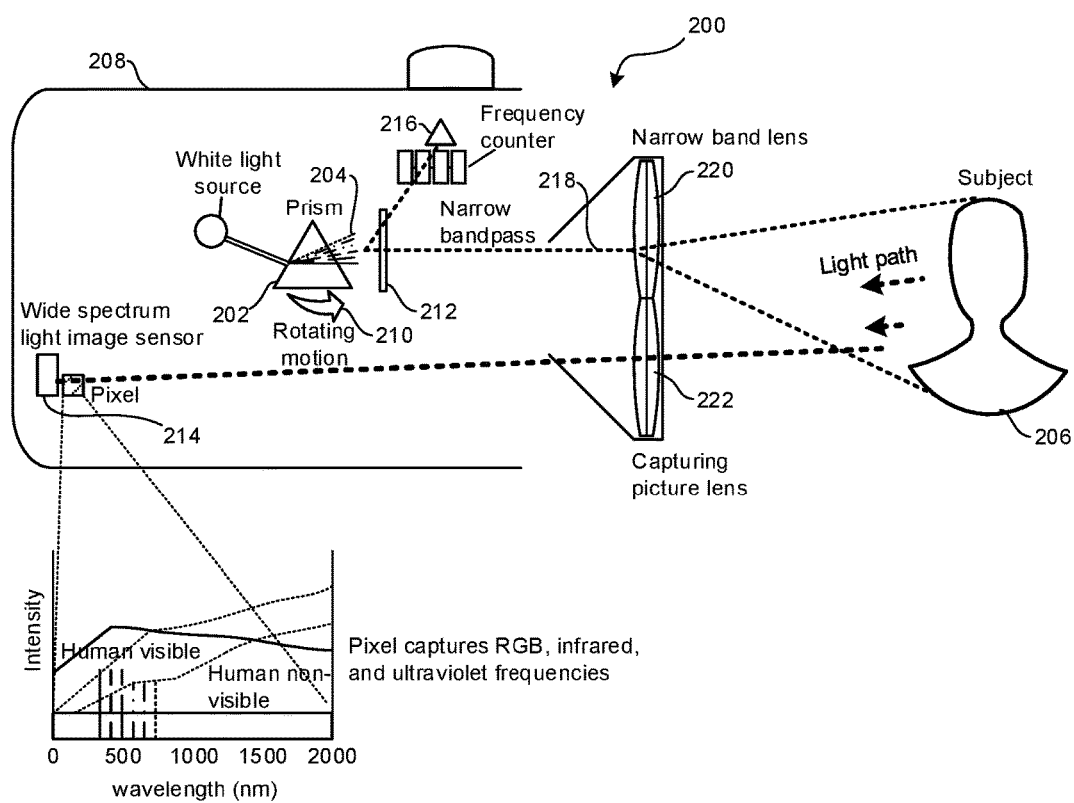
FIG. 2 is a schematic diagram of a simplified system consistent with present principles.

Turning now to FIG. 2, an apparatus 200 includes one or more beam dividers 202 to receive white light from one or more lamps, the sun, etc. and output separate color components 204 of the white light to illuminate an object 206 with a single one of the color components at a time, such that the object 206 is illuminated with a first color component and no other color components at a first time and a second color component and no other components at a second time. More generally, a wide range of color components of white light may be used to individually, at respective times, illuminate the object 206. For example, at least four and preferably five or more color components of white light are used to individually, at respective times, illuminate the object. Indeed, dozens and in some cases hundreds of individual color components of white may be used according to these principles to illuminate the object.

To this end, in the embodiment shown the beam divider can be established by a rotating prism mounted for spinning on a housing 208, as indicated by the arrow 210. The prism may be rotated by attaching it to a shaft of a small DC motor, for example. In another example, the prism may not be mounted for spinning on the housing and instead may be stationarily mounted on the housing, and the beam divider may further include a movable slit 212 positioned in an optical path that includes the prism and the color light output from the prism. When a slit 212 is used, it may be moved as appropriate to direct a single one at a time of the divided-out color components of the white light toward the object 206. The slit may be moved on a linear actuator such as a rack-and-pinion mechanism driven by a stepper motor, by way of non-limiting example. While the beam divider 202 above is implemented using a prism, in some embodiments it may be implemented using a grating.

One or more black and white imagers 214 such as a high resolution black and white camera are provided for receiving, from the object 206, reflections of the prism-separated color components of the white light. Thus, the black and white pixel values output by the imager 214 represent the intensity of reflection for the particular color component that generated the pixel values.

One or more wavelength reference receivers (WRR) 216 receive from the beam divider 202 the separate color components of the white light, such that (using the terminology above used to introduce the prism) the WRR 216 receives the first color component and no other color components at the first time and the second color component and no other components at the second time. In this way, information from the WRR 216 can be correlated with pixel information from the black and white imager. The WRR may be implemented using one or more frequency counters such as color-sensitive light sensor arrays or frequency-sensitive pixels that receive output light from the beam divider 202.

In any case, the fact that at time $t=t_i$ it can be known from the WRR 216 that the $i^{th}$ color component of white light illuminated the object 206. It can also be known from the imager 214 that at time $t_i$ one or more-pixel values were generated based on light reflected from the object with an intensity level "i". From this correlation, it is therefore known that the object 206 reflects the $i^{th}$ color component of white light with a reflectance that produces an intensity level "i", thereby providing information regarding the identity of the substance or substances of the object 206.

Accordingly, any of the processors disclosed herein may receive information from the apparatus 200 and may be programmed with instructions implementing the above principles to, based on the information from the WRR 216 correlated with the pixel information from the black and white imager 214, output an indication of color response of the object 206.

In some examples, a first light pipe 218 may be disposed in an optical path between the beam divider 202 and the object 206 to direct the color components from the beam divider to the object. In the example shown, the light pipe 218 directs the color components to a narrow band lens 220, which outputs light toward the object 206. Reflected light from the object 206 may be captured by a capturing lens 222 and sent to the imager 214. If desired, a second light pipe 224 may be disposed in an optical path between the beam divider 202 and the WRR 216 to direct the color components from the beam divider to the WRR, it being understood that the beam divider is configured and its motion synchronized such that the WRR 216 receives the same color component from the beam divider that the beam divider is at that moment sending toward the object 206. Light pipes may be established by suitable light conducting mechanisms such as but not limited to optical fibers.

Figure 3:
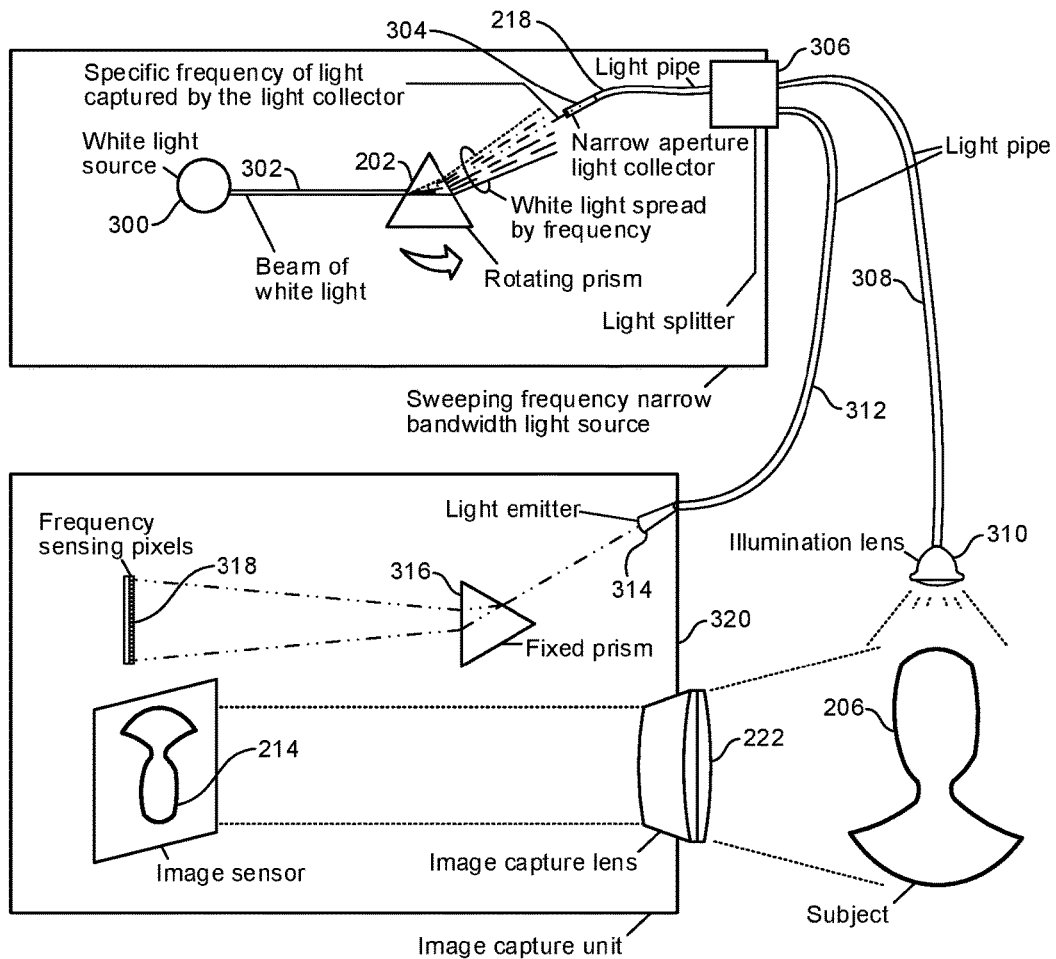
FIG. 3 is a schematic diagram of an example that uses a spinning prism.

FIG. 3 illustrates a more detailed view of an alternate implementation of the apparatus 200 in FIG. 2. A source 300 of white light (which may be the sun or white light lamps) sends white light 302 to the prism 202, which outputs individual color components of the white light. As the prism rotates this will line up with a different portion of the spectrum and therefore be a different frequency of light. The color components output by the prism are picked up by a narrow aperture light collector 304 that in turn directs the light into the light pipe 218. The prism 202 outputs light that is of a very narrow bandwidth, but the frequency of the light emitted sweeps across a wide bandwidth of light frequencies, in most implementations extending beyond the range of frequencies that humans can detect in both the infrared and ultraviolet ends of the spectrum. The light collector 304 selects a narrow band out of the spectrum output by the prism. In some implementations, the light collector may be implemented by a slit to maximize the quantity of light collected while still maintaining a narrow bandwidth of frequencies collected.

In the example of FIG. 3, a light splitter 306 intercepts the light output by the light pipe 218, sending most of the light through a second light pipe 308 to an illumination lens 310, which illuminates the object 206. Some of the light, however, is sent from the light splitter 306 through a light pipe 312 to a light emitter 314, which illuminates a (preferably fixed) prism 316. The fixed prism 316 then bends the light as appropriate for its color toward an array 318 of frequency sensitive pixels to record the particular color at the particular time it was received, establishing an example of a WRR 216. In other words, the fixed prism 316 spreads the frequency detection light based on frequency. The array 318 may be implemented by a line of pixels spread across the spectrum output by the fixed prism 316. Which pixel is illuminated corresponds with the angle that the light left the fixed prism 316, which depends on the frequency of the light. In some implementations, the array 318 can be a row of pixels on the edge of image sensor 214 that are separated from the rest of the image sensor by light shielding. This has the advantage that the intensity of the illuminated pixels can be used to compensate for differing intensities of the light emitted at different frequencies and differing sensitivities to light at different frequencies by image sensor 214.

FIG. 3 also illustrates that the imager 214 may receive reflections of light from the object 206 through the capturing lens 222. The WRR 216 and imager 214 with lens 222 may be implemented in a modular image capture unit 320 as shown, that may be separate from the housing that holds the rotating prism.

Figure 4:
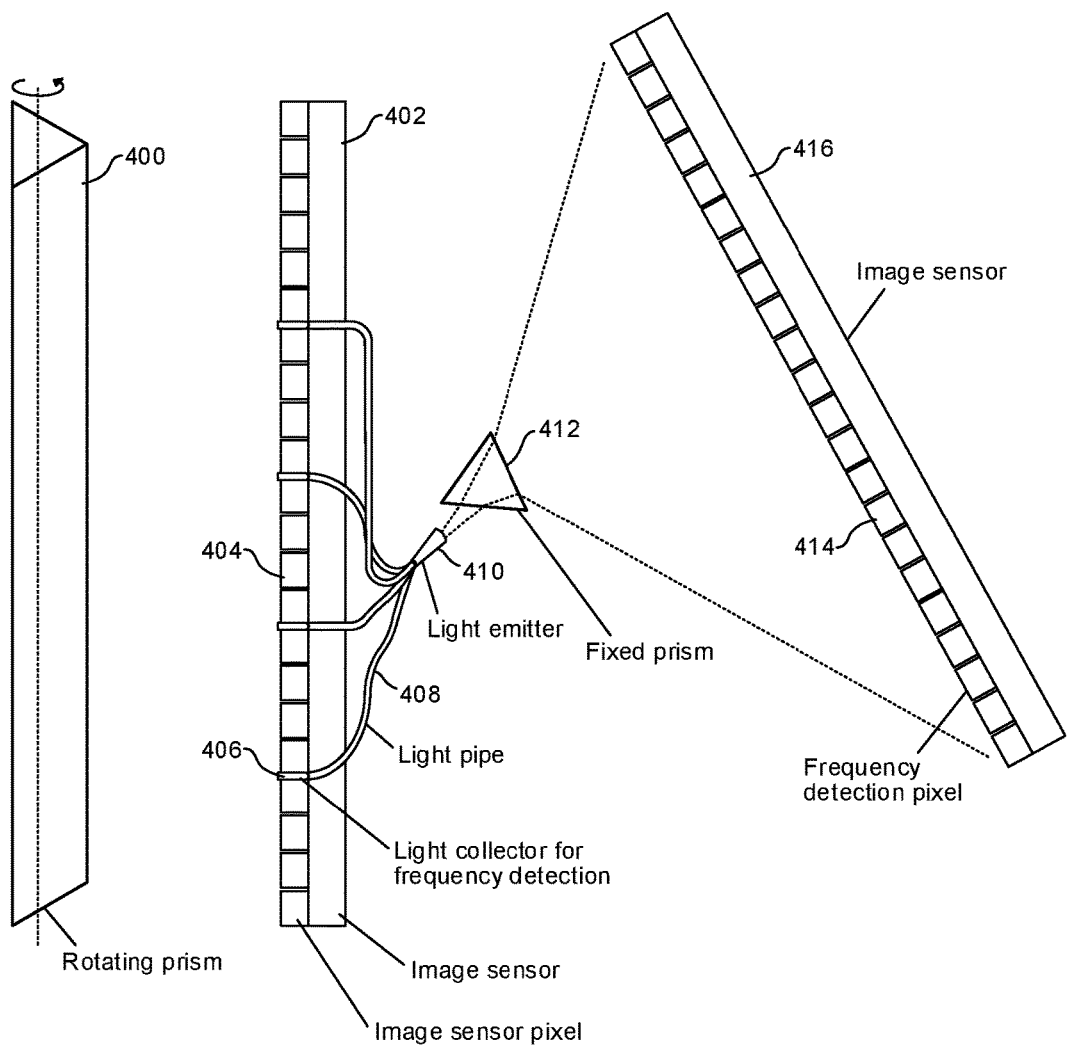
FIG. 4 is a schematic diagram of an example that uses a spinning prism to direct light onto an object and a fixed prism to direct the light onto a frequency sensor for correlation purposes with pixels from the black and white imager.

Turn now to FIG. 4 for another example. An elongated rotating prism 400 receives white light from the object. Thus, unlike the embodiment of FIG. 3, in FIG. 4 the object is illuminated with white light and the reflections of the white light are spread into separate color components onto an imager. In the example shown the output of the prism is sent to an image sensor 402 such as a black and white high-resolution sensor, it being understood that each row or column of imager pixels may be illuminated by a respective rotating prism, and that FIG. 4 shows only a single row of pixels with the prism for that row. By rotating the prism 400, the frequency of light that is emitted in the directions of the pixels 404 of the sensor 402 sweeps across the spectrum of light coming into the camera in the direction of the pixels. Some implementations may be oriented by column instead of by row (only a single row shown). It will readily be appreciated that the image sensor pixels 404 are sensitive to a wide bandwidth of frequencies. In most implementations, this will extend beyond the frequencies that humans can detect. Each pixel 404 captures one pixel of the image being captured.

Light collectors 406 are part of the sensor 402 and sense/collect the frequency of light emitted in the direction of the pixels 404 by the prism 400. The light collectors 406 are in line with the pixels 404 to capture light emitted by the prism 404 in the directions of the pixels for determining the frequency of that light. By having several collectors 406 per row it still allows frequency detection when one portion of the row is dark for the current frequency.

Light pipes 408 guide the light from respective light collectors 406 to a light emitter 410. The light emitter 410 in turn directs the frequency detection light into a fixed prism 412. In some implementations, the light is emitted only in the plane of the row of pixels so that upon exiting the fixed prism 412 the light only strikes frequency detection pixels 414 corresponding to the row of pixels. In some implementations light shielding is used between rows of frequency detection pixels 414 to prevent light from the light emitter or emitters 410 corresponding to the other rows from hitting the pixels 414.

The fixed prism 412 spreads the frequency detection light by frequency. In some implementations, a single fixed prism is used, spanning an entire second image sensor 416 which implements the frequency detection pixels 414. The second image sensor 416 detects the frequency of light striking each row of pixels 414. Each row of pixels 414 in the second (frequency detector) image sensor 416 corresponds with one row of pixels in the main image sensor 402, and corresponds with one rotating prism 400, with each row of pixels 404 potentially being illuminated by its own respective rotating prism. The frequency of light reaching image sensor pixels 404 for the row is determined by which pixels 414 in the row of the frequency detection pixels receive light. The frequency detection pixels 414 are sensitive to a wide bandwidth of frequencies. The row of frequency detection pixels 414 is aligned with the spectrum of light output by the fixed prism 412 so that the row spans the frequency bandwidth to be detected.

To calibrate such a camera a technique similar to that used to set a custom white balance may be used. A diffusion medium that scatters the incoming light is placed in front of the lens and the camera is aimed at the light source illuminating the subject. An image is captured. The intensity of light captured at each frequency is a combination of the intensity of that frequency in the light source and the sensitivity of pixels to light of that frequency. This can be used to compensate for both factors to get a flat frequency response.

To calibrate which frequency detection pixels, correspond to each frequency of light a light source that emits light in narrow bands of known frequency, such as a white LED of known composition, can be used. The frequency detection pixels excited will correspond to those known frequency bands.

Figure 5:
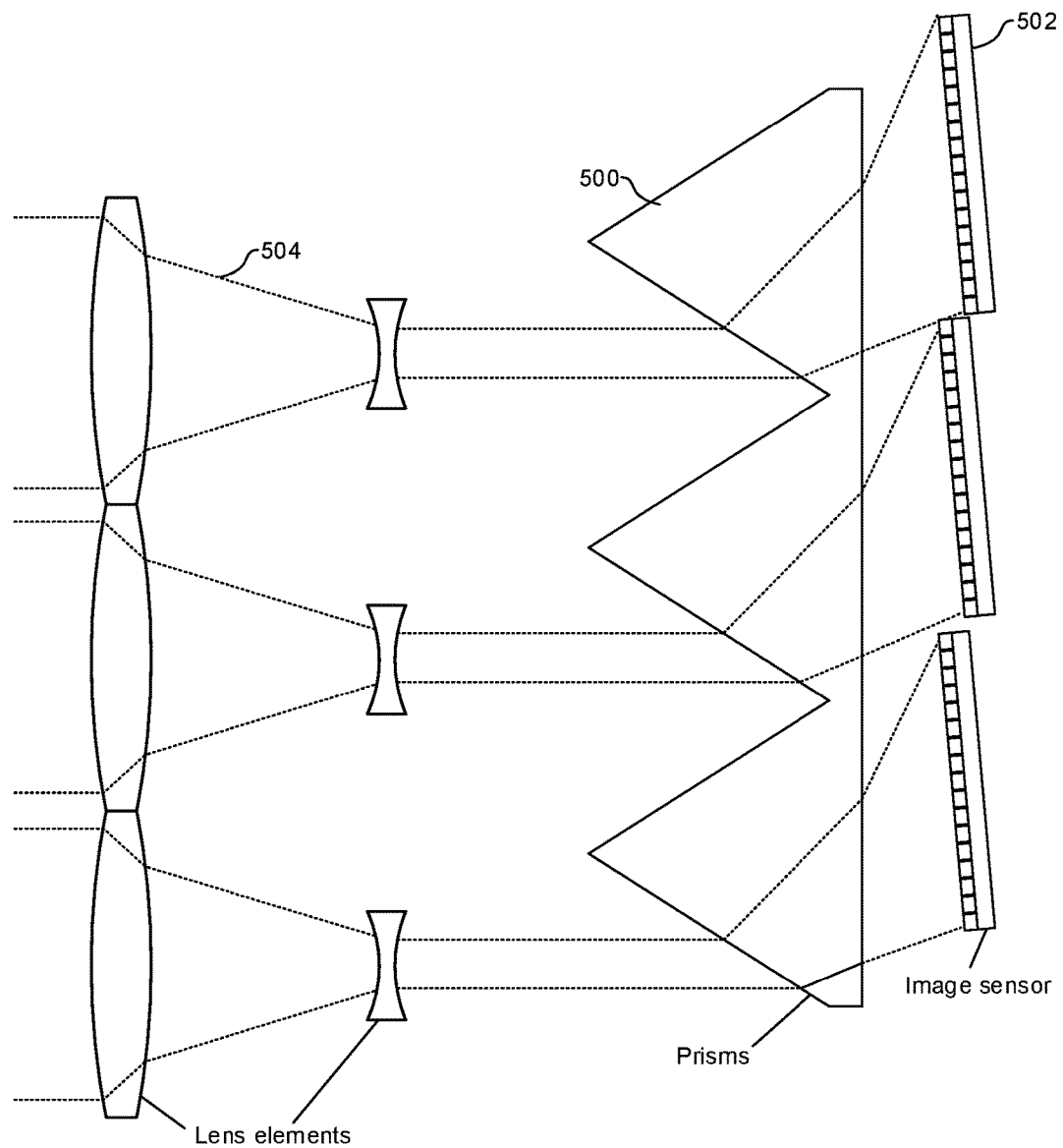
FIGS. 5-7 are schematic diagrams of examples that use an array of fixed prisms to direct color components of light onto respective image sensor arrays.

Refer now to FIG. 5 for another implementation consistent with present principles. Plural prisms 500 are configured to receive reflections of white light from an object. In FIG. 5, each prism is in optical communication with a respective group of pixels 502 established by at least one image sensor, with the respective groups of pixels indicating information pertaining to spectral reflection from the object in plural color components.

The prisms 500, which may be stationarily mounted on a housing, spread the incoming light from the object to be imaged into a spectrum. The prisms 500 may be aligned with the incoming beams or planes of light and are aligned to project the spectrums they emit onto the respective image sensor 502. In some implementations, adjoining prisms can be connected, as shown in FIG. 5. In some implementations, the prisms 500 extend across the whole image sensor established by the individual arrays 502.

In the example of FIG. 5, the image sensors 502 are disposed on a sawtooth shaped surface to align the portion of the sensor for each pixel so that it is perpendicular to the spectrum output by the respective prism 500 for that pixel. The pixels on the image sensor are sensitive to a wide bandwidth of frequencies. In some implementations, non-square rectangular pixels are used, which takes advantage of the fact that there is a need for high resolution in the dimension that the spectrum is spread across, but the resolution in the perpendicular dimension can be much less dense.

In some implementations, an image sensor with square pixels is used. This has the advantage that existing manufacturing processes produce image sensors with square pixels. In some implementations, the values from a plurality of image sensor pixels that are aligned with the same frequency of the spectrum output by prism 500 for a single camera pixel are used to calculate the intensity value for that frequency for that camera pixel.

Lenses 504 may be disposed in respective optical paths that include the respective prisms 500. The lenses 504 focus light into a directional beam. In some implementations, there are individual lenses for each pixel. In some implementations bars of lenses can span a whole row or column of pixels, which will create a plane of light instead of individual beams for each pixel.

Figure 6:
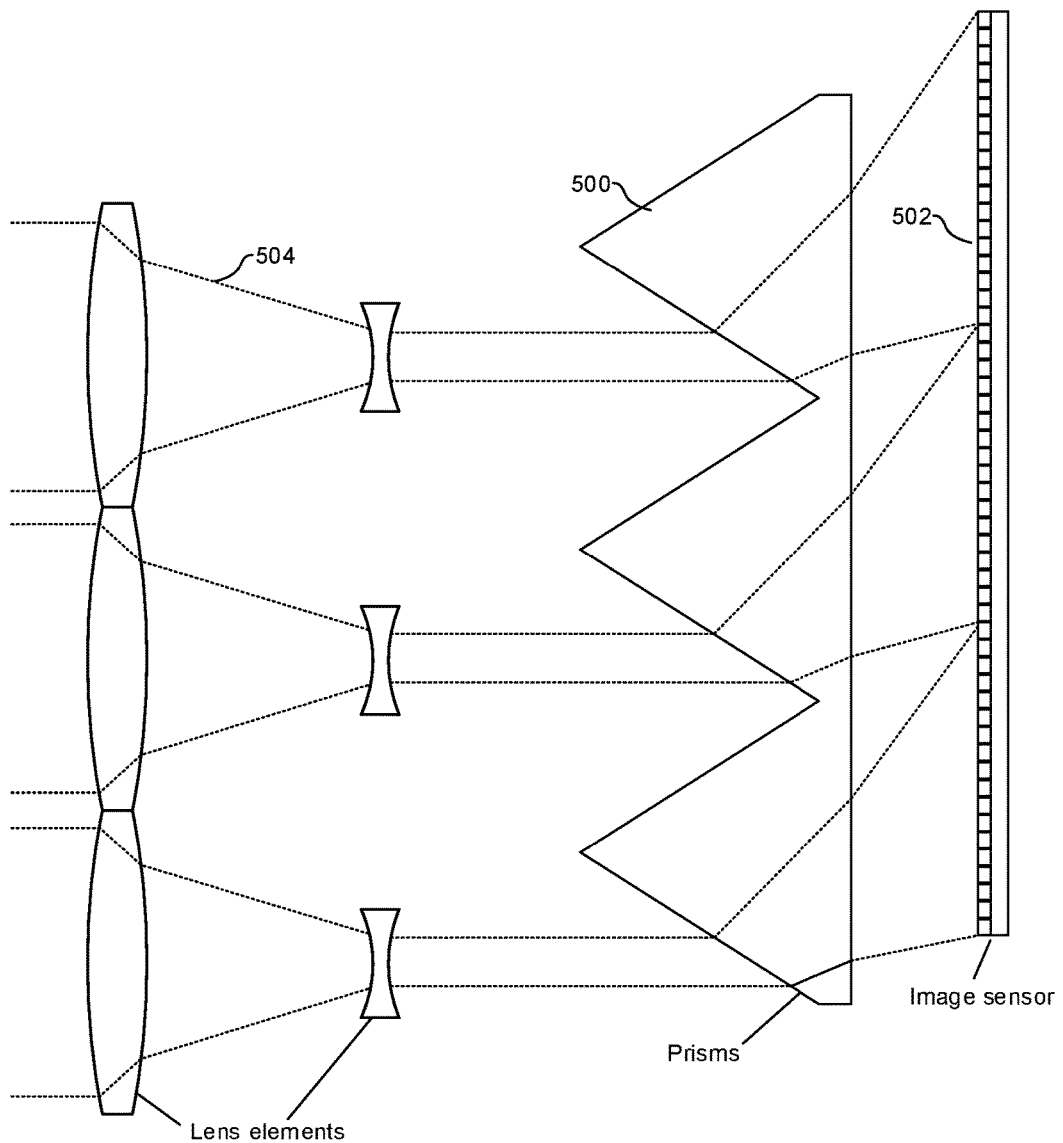
Figure 7:
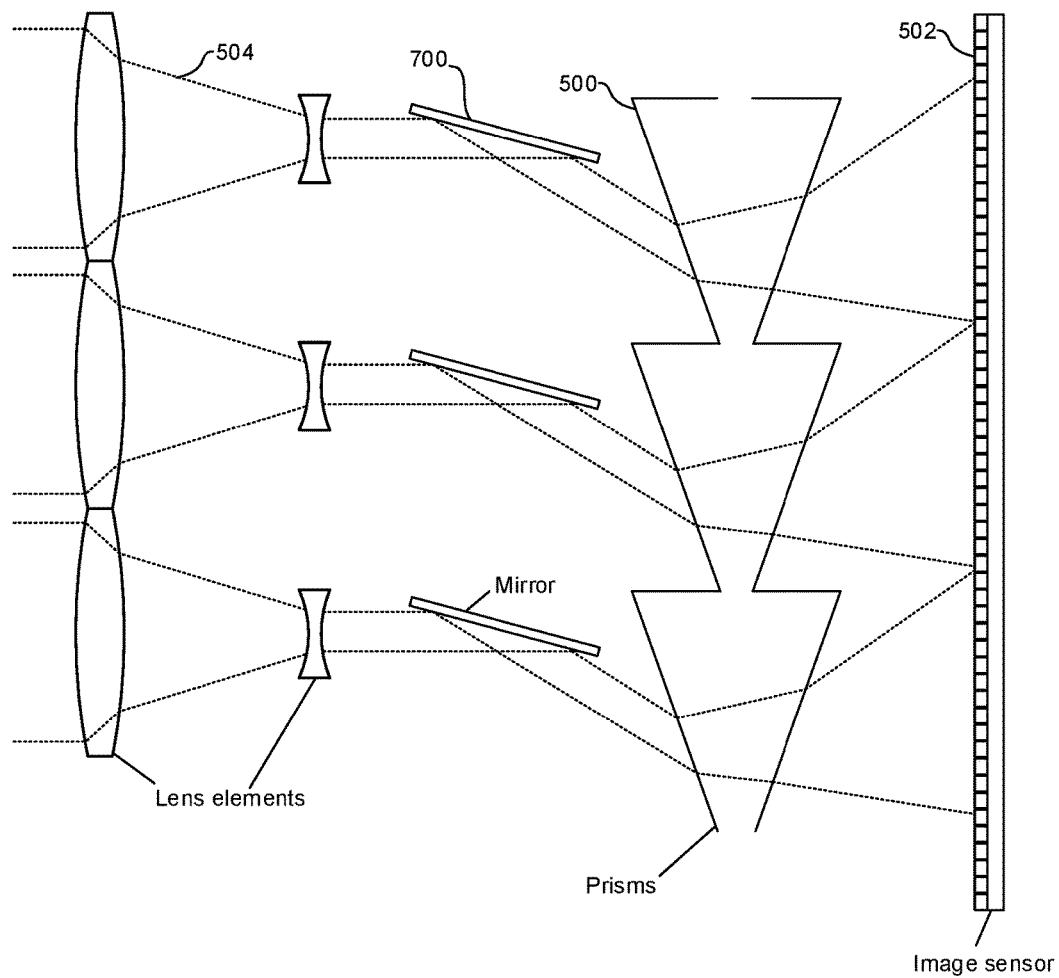

FIGS. 6 and 7 illustrate modified systems of FIG. 5. The prisms 500 in FIG. 7 are rotated with respect to the orientations of the prisms 500 in FIGS. 5 and 6 to align their spectrum output with image sensor 502 so that there is a uniform distribution across a flat image sensor. In FIGS. 6 and 7 the image sensor 502 is a single image sensor on a flat plane. In FIG. 6 the image sensor 502 is not perpendicular to the spectrum output by the prism 500 for the respective pixel, which causes one end of the spectrum to spread out across the image sensor more than the other end. This can be compensated for with software, but the frequency resolution in the resulting image will be less than the number of pixels that the spectrum spans on the image sensor, or the selectivity of the individual frequencies will be blurred.

Also, in FIG. 7 respective mirrors 700 may be disposed between at least some of the lenses 504 and prisms 500. The mirrors 700 change the angle of the incoming light so that the prisms 500 can be oriented so that the center of the spectrum they output is perpendicular to the image sensor 502, which allows a uniform distribution of the spectrum across the image sensor pixels.

In the implementations shown in FIGS. 5-7 there need not be a one-to-one relationship between the pixels on the image sensors used and the pixels in the images generated by the camera. To avoid ambiguity, "camera pixel" refers to the pixels in the generated images and "image sensor pixel" refers to the pixels on an image sensor.

It will be appreciated that whilst present principals have been described with reference to some example embodiments, these are not intended to be limiting, and that various alternative arrangements may be used to implement the subject matter claimed herein.

What is claimed is:

1. Apparatus comprising:
   at least one beam divider to receive white light and output separate color components of the white light to illuminate an object with a single one of the color components at a time, such that the object is illuminated with a first color component and no other color components at a first time and a second color component and no other components at a second time;
at least one black and white imager configured for receiving, from the object, reflections of the separate color components of the white light; and
at least one wavelength reference receiver (WRR) receiving from the beam divider the separate color components of the white light, such that the WRR receives the first color component and no other color components at the first time and the second color component and no other components at the second time, such that information from the WRR can be correlated with pixel information from the black and white imager.

2. The apparatus of claim 1, wherein the beam divider includes a prism.

3. The apparatus of claim 1, wherein the beam divider is mounted for spinning on a housing.

4. The apparatus of claim 2, wherein the prism is not mounted for spinning on a housing and is stationarily mounted on the housing, and the beam divider further comprises a movable slit positioned in an optical path that includes the prism.

5. The apparatus of claim 1, wherein the beam divider includes a grating.

6. The apparatus of claim 1, comprising at least a first light pipe in an optical path between the beam divider and the object to direct the color components from the beam divider to the object.

7. The apparatus of claim 1, comprising at least a first light pipe in an optical path between the beam divider and the WRR to direct the color components from the beam divider to the WRR.

8. The apparatus of claim 1, wherein the WRR comprises at least one frequency counter.

9. The apparatus of claim 1, comprising at least one processor programmed with instructions to, based at least in part on the information from the WRR correlated with the pixel information from the black and white imager, output an indication of color response of the object.

10. The apparatus of claim 1, wherein the WRR comprises at least one prism outputting light to an array of frequency sensing pixels.

11. An apparatus, comprising:
a rotatably mounted prism spreading white light from an object into separate color components;
a stationarily mounted prism for receiving light from the rotatable mounted prism and sending the light to an array of frequency detection pixels; and
an image sensor disposed between the rotatably mounted prism and the stationarily mounted prism to receive the color components of white light from the object and establish pixels values representing the color components.

12. The apparatus of claim 11, comprising at least one light collector integrated with the image sensor and communicating with the stationarily mounted prism to conduct light to the stationarily mounted prism.

13. An apparatus, comprising:
plural prisms configured to receive reflections from an object;
each prism in optical communication with a respective group of pixels established by at least one image sensor, the respective groups of pixels indicating information pertaining to spectral reflection from the object in plural color components.

14. The apparatus of claim 13, wherein the respective groups of pixels are established by a single one image sensor.

15. The apparatus of claim 13, wherein the respective groups of pixels are established by respective image sensors.

16. The apparatus of claim 13, comprising respective lenses in respective optical paths that include the respective prisms.

17. The apparatus of claim 16, comprising respective mirrors between at least some of the lenses and prisms.

18. The apparatus of claim 13, wherein the prisms are stationarily mounted on a housing.

19. The apparatus of claim 13, wherein the prisms are connected to each other.

20. The apparatus of claim 13, wherein the image sensor is disposed on a sawtooth surface.

* * * * *